Inventors
Victor Rakowsky
Ray W. Arms
Charles B. Hebbard
By Cameron, Kerkam & Sutton
Attorneys Oct. 17, 1939.        V. RAKOWSKY ET AL        2,176,189
SEPARATING FRAGMENTARY MATERIALS
Filed Aug. 10, 1936        5 Sheets-Sheet 4
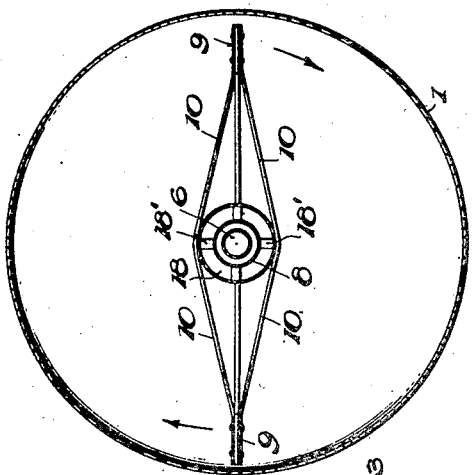
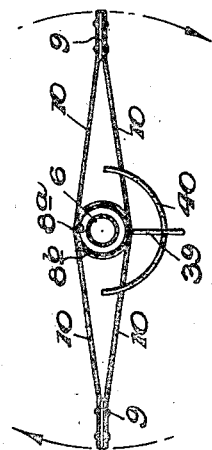
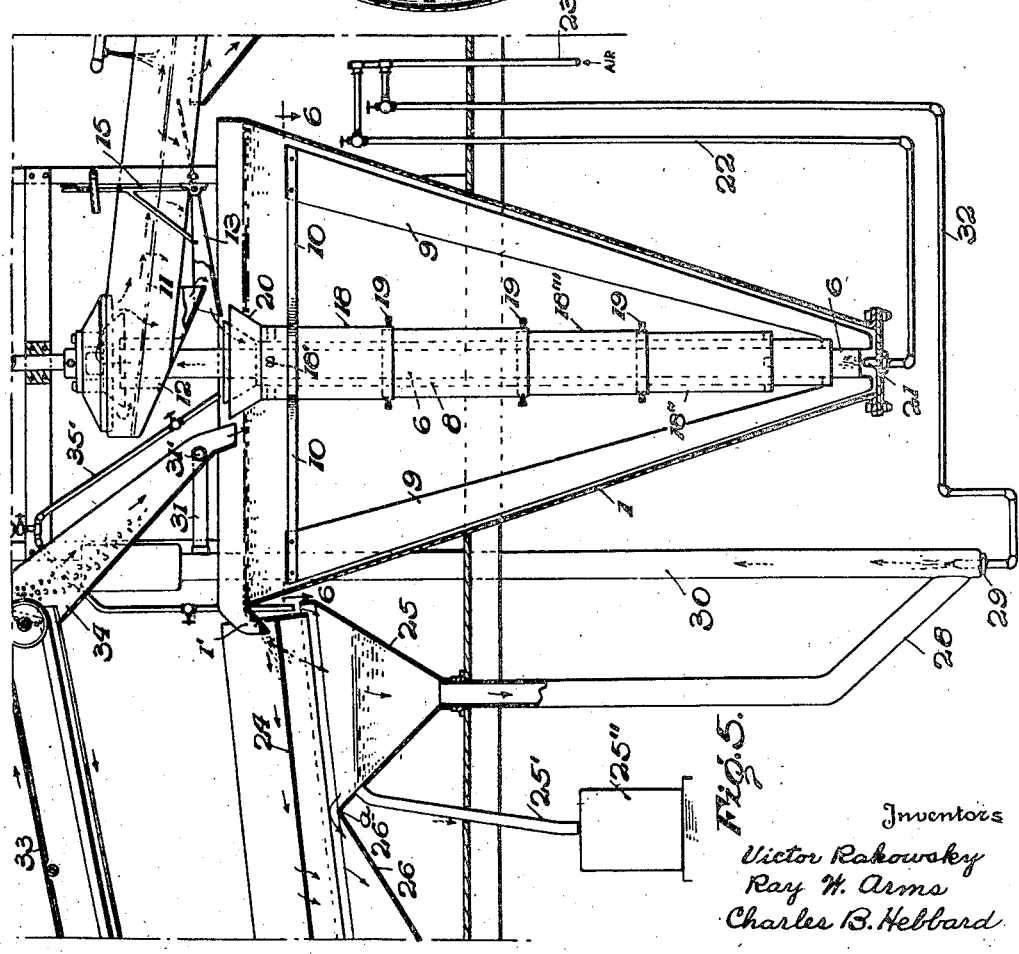

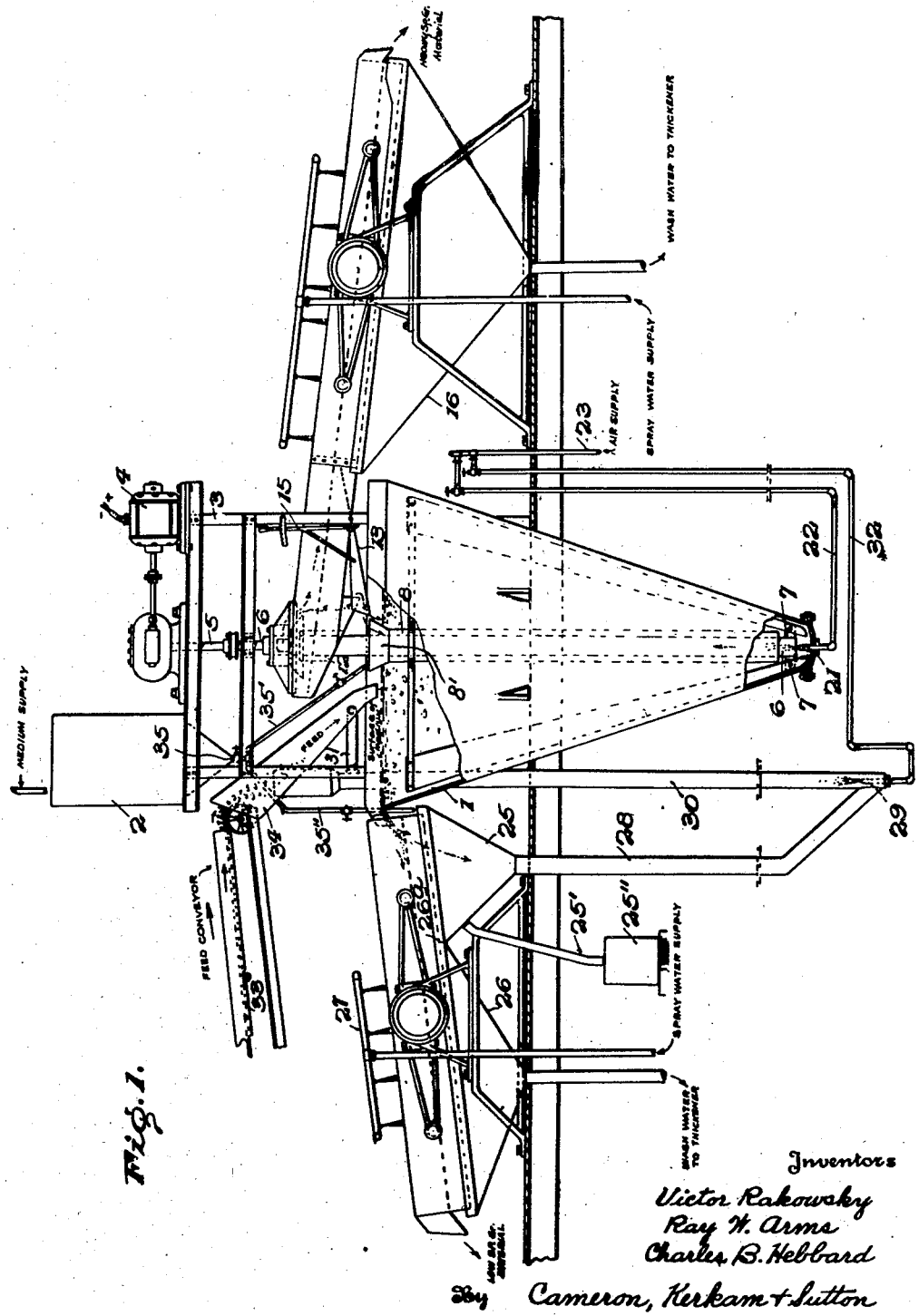

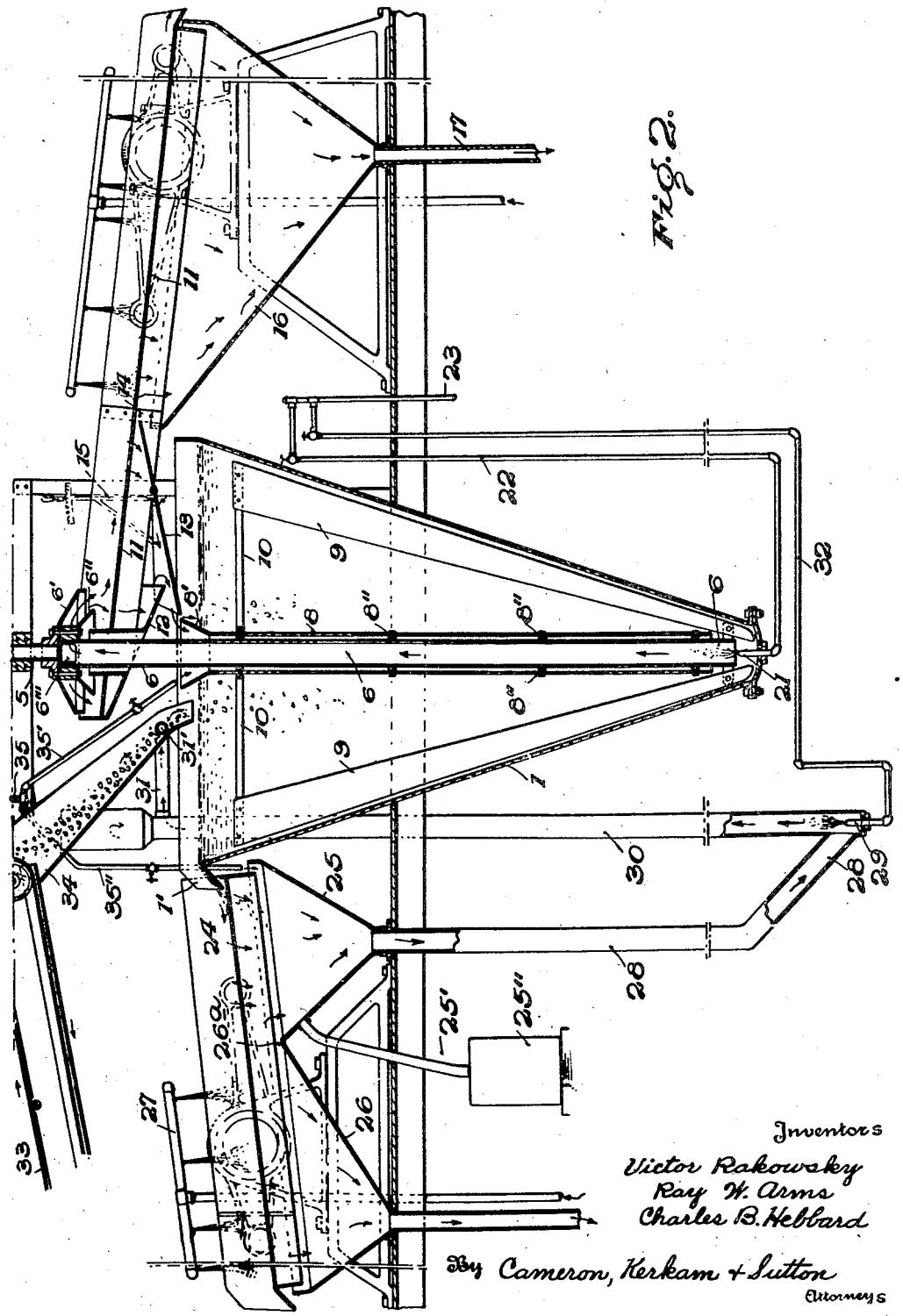

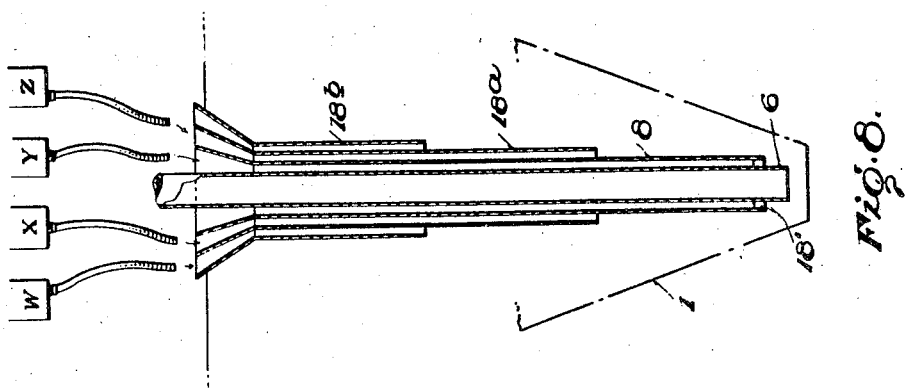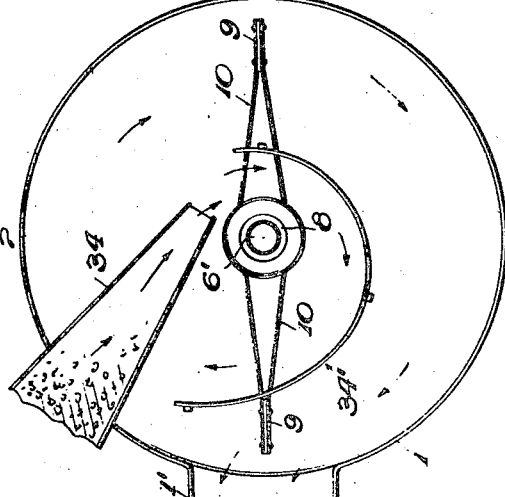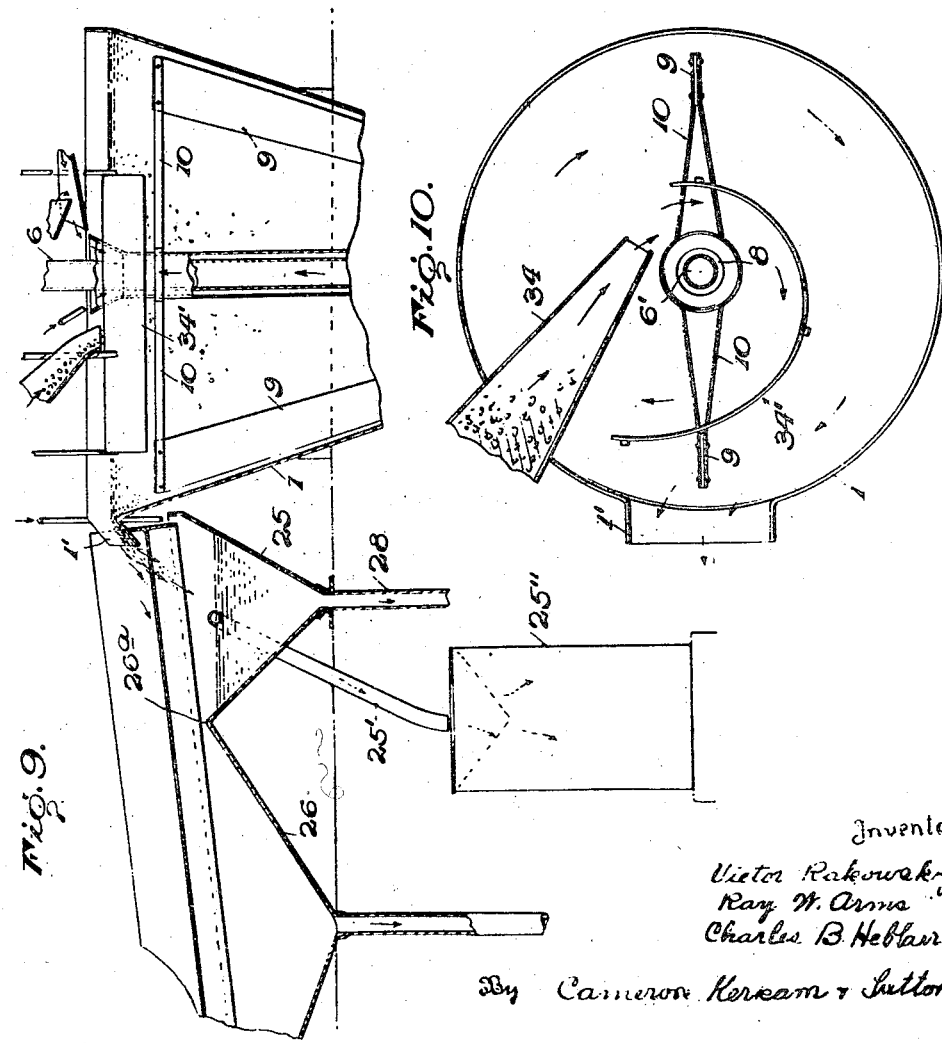

Patented Oct. 17, 1939

2,176,189

UNITED STATES PATENT OFFICE 2,176,189

SEPARATING FRAGMENTARY MATERIALS

Victor Rakowsky, Joplin, Mo., Ray W. Arms, Evanston, Ill., and Charles B. Hebbard, Mascot, Tenn., assignors to Minerals Beneficiation, Incorporated, a corporation of Delaware Application August 10, 1936, Serial No. 95,238

22 Claims. (Cl. 209—173)

This invention relates to a process and apparatus for separating and classifying fragmentary materials of differing specific gravities. It has heretofore been proposed to feed such fragmentary materials into a liquid separating column, the specific gravity of which column gradually and continuously increases from the top downward to the end that the lighter fragmentary materials may be floated at or near the top of the separating column while the heavier materials will sink either to, or approximately to, the bottom of said column, and continuously removing the lighter materials from the top and the heavier materials from the bottom of said column. In the practice of this method some of the liquid medium is removed from the containing tank at the top, together with the lighter material, and some of the liquid medium is removed from the bottom of the tank, together with some of the heavier material. Means have been provided for returning the lighter medium to the top of the tank and the heavier medium to the bottom thereof, together with such additional supply of medium as may be necessary to maintain the level of the medium in the tank at the proper height to permit the overflow thereof from the tank during the removal of the lighter material floating thereon or therein.

In the practice of such process it is a matter of importance to maintain the separating liquid column in the tank in such a condition that the specific gravity of the medium continuously and constantly increases from the top downward. While this process referred to has gone into commercial, practical use in the separation of slate and other refuse from coal and also in the classification of ores, it has been found difficult to control the specific gravity of the separating medium so that the specific gravity thereof shall not only continuously increase from the top downward, but also to adjust the specific gravity of the medium as a whole to the conditions best suited to effect rapid and accurate separation of the particular character of materials under treatment.

One of the objects of the present invention is to provide a process and an apparatus whereby the specific gravity of the separating medium in the tank may at all times be under ready and effective control, to the end that, whether the specific gravity of the separating column shall continuously and gradually increase from the top to the bottom or not, the specific gravity of the column, considered as a whole, may be varied to suit the changing conditions in the character of the coal, ores, or other fragmentary materials to be separated. To this end the invention provides for the overflow of lighter liquid medium from the top of the separating column, carrying therewith the lighter separated material; removal of the heavier material, together with some of the separating medium of greater specific gravity from the bottom thereof; separating the removed lighter fragmentary material and liquid medium and returning said lighter separated medium to the top of the separating column; separating the heavier removed material from the heavier gravity medium removed from the bottom of the column; and returning some of said heavier medium at will to the top of the column, the bottom of the column, or to any intermediate point between the bottom and top of the column, while the main body of said separated medium is returned to the bottom of the column.

Any appropriate tank for containing the gravity separating medium may be employed, but preferably such tank is in the form of an inverted cone, and the heavier fragmentary material which has sunk to the bottom of the cone and some of the heavier separating medium are removed from the cone through a pipe extending upward within the cone from a point near the bottom of the cone to a point above the surface of the separating medium. Any suitable means, as a bucket elevator, may be employed to elevate the heavier material (and with it some of the separating medium) through this pipe, but preferably a jet of air under pressure is directed into the bottom of the pipe, and acts after the manner of an air-lift to effect this result. The fragmentary material and the medium that have been thus removed from the bottom of the tank are separated and the separated medium is returned to the column in the tank at the top surface thereof, or near the bottom, or at some point between the bottom and the top of said column as conditions may require.

The inventive idea involved may be embodied in a variety of forms of apparatus, some of which, for the purpose of illustrating the invention, are shown in the accompanying drawings, but it is to be expressly understood that such drawings are for the purpose of illustration only and are not designed to define the limits of the invention, reference being had to the appended claims for that purpose.

In said drawings,

Fig. 1 is a side elevation of one form of apparatus with parts broken away;

Fig. 2 is a vertical sectional view of the apparatus shown in Fig. 1;

Fig. 5 shows a still further modification of the construction shown in Fig. 3;

Fig. 6 is a top plan view on the line 6—6 of Fig. 5;

Fig. 7 is a top plan view on the line 7—7 of Fig. 3;

Fig. 8 is a vertical detail section of a modification;

Fig. 9 is a broken sectional detail; and

Fig. 10 is a top plan view of Fig. 9.

Figure 4:
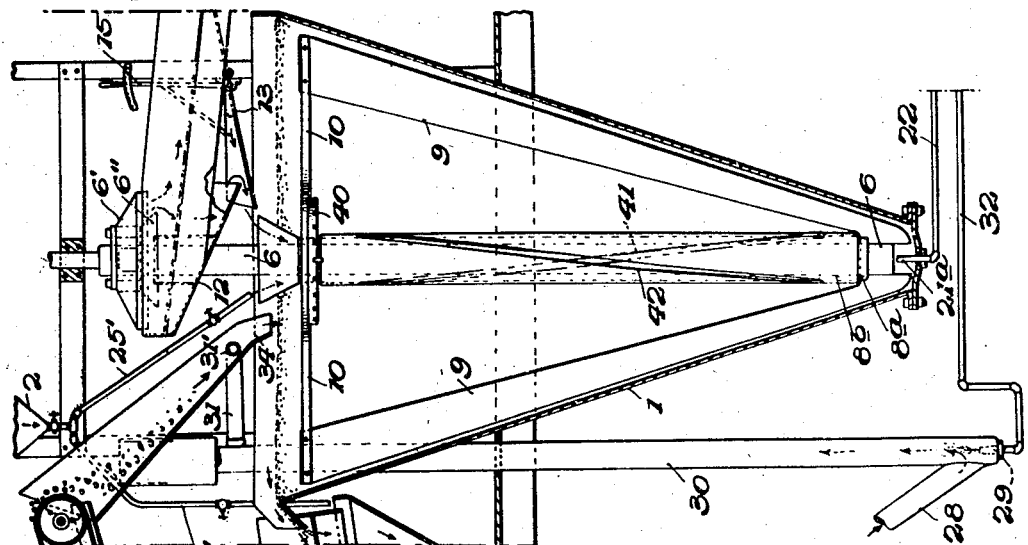
Fig. 4 illustrates a modification of the construction shown in Fig. 3.

Referring to the drawings, in which like reference numerals indicate like parts throughout the several views, 1 is a separating tank of any suitable form, here shown in the form of an inverted cone containing a liquid gravity separating medium, the specific gravity of which gradually and continuously increases from the top to the bottom thereof. Said medium preferably consists of water with any suitable finely divided solid known to the art suspended therein. Commercial lead sulfide concentrates produced by the oil flotation process have been found to give most excellent results. Such concentrates can be obtained at a reasonable cost and in widely distributed localities. Moreover, these concentrates lend themselves readily to the necessary control of the differential density of the separating medium when in continuous circulation as required in the practice of the process.

The medium is supplied to the separating tank 1 from any suitable source of supply 2 in a manner hereinafter to be described. Mounted on a suitable framework 3, is a motor 4, here shown as an electric motor, which motor is suitably geared to a shaft 5 moving in bearings above the conical tank 1. This shaft 5 is rigidly connected to a pipe 6 concentric with the conical tank 1 and extending downward into the tank to near the bottom thereof where said pipe 6 takes bearing in brackets 7—7. Secured to and concentric with this pipe 6 is a second pipe or conduit 8 open at its bottom, and having a flared open top 8', extending above the surface of the separating medium in the cone 1. The bottom of this conduit 8 is near the bottom of the cone 1 but somewhat above the bottom of the pipe 6. This conduit 8 is secured to the pipe 6 in any suitable manner, as by lugs 8'', Fig. 2, and revolves with the pipe.

Referring now to Figs. 1 and 7, 9—9 are blades whose lower ends are secured to the pipe 6 (see Fig. 1) and whose upper ends are supported on bracket arms 10—10, extending radially outward from near the top of the conduit 8, so that the blades 9—9 revolve with the pipe 6 and the conduit 8, and, as here shown, their path of travel is parallel with the walls of the cone 1 and slightly removed therefrom.

The top of the pipe 6 is provided with two umbrella-like, vertically spaced deflectors 6'—6'' which are secured thereto and revolve therewith, and between these two deflectors the pipe is provided with a plurality of lateral openings 6''', one of which is shown in Fig. 2. Below these deflectors 6'—6'' is a downwardly inclined sheet 11 of foraminous material upon which the separating medium and the heavier fragmentary material that are elevated through the pipe 6, as hereinafter described, are delivered. The liquid medium passes through the perforated or foraminous sheet 11 and falls upon two downwardly inclined planes or troughs 12 and 13. These two planes 12 and 13 are reversely inclined toward each other, and the lower end of the plane 13 extends beyond and beneath the lower end of the plane 12. Plane 13 is pivoted at its upper end 14 and is provided with an adjusting bar 15 whereby it may be adjusted so that the liquid medium flowing down the same may be directed into the flaring top 8' of the conduit 8 or directly onto the surface of the separating medium in the cone 1.

The ability to return the heavy separating medium thus removed from the bottom of the tank to the surface of the medium in the tank is in some cases a matter of extreme importance. For example, the gangue of iron ore and the iron itself are both of high and very nearly equivalent specific gravities, and in order that the gangue may be floated it is desirable that the specific gravity of the separating medium be as high as possible and yet maintain the liquidity of the medium. In this case the specific gravity of the medium at the top of the tank would be but slightly lower than the specific gravity at the bottom of the tank, and in order to maintain the specific gravity at the top of the tank at the high point desired, it is frequently found desirable to introduce into the top of the tank the heavier separating medium withdrawn from the bottom of the tank, or supply additional high gravity medium from an outside source.

Any suitable means may be employed for imparting a shaking or trembling movement to the downwardly inclined foraminous sheet 11 and the heavier solids that are deposited thereon from the pipe 6 are caused to travel downward. For the first considerable portion of their travel they are above the planes or troughs 12 and 13, and by the time they pass the upper end of the plane or trough 13 all of the liquid medium, except a small portion that adheres to or wets the fragmentary material, is drained therefrom. For the purpose of removing the small part of the liquid separating medium which serves to wet the particles, the same are sprayed with water after they pass the point 14 of the plane 13, and are thus washed clean, the water and the medium that is washed therefrom being received in a receptacle 16 provided with a delivery pipe 17 leading to a suitable storage tank, not shown.

Referring now to Figs. 5, 6 and 8, 18 is a third conduit concentric with the conduit 8 but spaced therefrom and carried thereby, and open at its bottom. This conduit 18 is supported on the conduit 8, as by lugs or brackets 18', Fig. 6. Conduit 18 is composed of telescopic sections, the lower section 18'' telescopes within the next section 18''' thereabove and so on upward with the several sections. These sections are fixed in place by any suitable means, as set screws 19, and by telescoping these sections the lower or delivery end of the conduit 18 may be adjusted to any desired level in the tank or cone. The conduit 18 is provided with an outwardly flared top portion 20 into which liquid medium flowing down the plane 13 may be delivered when the latter is properly adjusted for this purpose. It will be seen that the adjustment of the telescopic sections of the conduit 18 necessarily are made before the tank is filled with the separating fluid medium and that it can be so adjusted as to have the heavier fluid medium that has been elevated through the pipe 6 returned to the tank at any desired distance above the bottom of the tank.

Referring now to Fig. 8, there is shown therein a preferred construction for introducing gravity separating medium into the tank at various levels between the bottom portion of the tank and the surface of the medium therein. In this construction the pipe 6 is not only surrounded by the conduit 8, also open at its bottom and leading to near the bottom of the tank, but the conduit 8 is in turn surrounded by a second conduit 18a, also open at the bottom and extending downward into said tank to any desired point above the bottom of the conduit 8; and this conduit 18a is in turn surrounded by still another conduit 18b, which is also open at the bottom. This conduit 18b extends downward into the tank to a point above the bottom of the conduit 18a. Each of these conduits is provided with a flared top similar to the flared top of the conduit 8. As here shown, there are only three of these exterior conduits, to wit, 8, 18a and 18b, but it is to be understood that any desired number of such conduits can be employed with the lower ends thereof at different heights above the bottom portion of the tank.

Still referring to Fig. 8, there is shown a series of tanks w, x, y and z, containing fluid separating medium. The specific gravity of the medium in all of these tanks is greater than that of the specific gravity of the upper portion of the fluid medium in the operating tank 1; and furthermore, the specific gravity in the several tanks is graded—that in tank x for example, is greater than in tank w, that in y greater than in x, and that in z greater than that in y. The specific gravity of the medium in tank z is also greater than that of the specific gravity desired in the lower portion of the operating tank 1. Each of these tanks w, x, y, z, has a suitable conduit, preferably in the form of hose, as shown, whereby the medium from any one of said tanks may be delivered into the flared upper portion of any one of conduits 8, 18a or 18b; or in case there are additional exterior conduits, into the flared opening of these additional conduits.

When fragmentary material is fed into the operating tank 1, it is generally damp and the effect of this would be to decrease the specific gravity of the contents of the tank as a whole, unless some means were provided for counteracting this diluting effect. By means of the series of medium supply tanks w, x, y and z, and the conduits leading therefrom, the operator can introduce into the tank, at any point therein above the bottom, medium of the required specific gravity to maintain the required specific gravity of the medium in the tank as a whole.

As above stated, any suitable means may be employed for elevating through the pipe 6 the particles of heavier fragmentary material from the bottom of the tank carrying with said heavier fragmentary material some of the heavier separating medium, also from the bottom of the tank. Such elevating means may take the form of an endless screw or continuously travelling elevator buckets, but as here shown, the same consists of a jet of air, under pressure, delivered from a jet or nozzle 21, which acts in the nature of an air-lift and forces the heavier fragmentary material and some of the heavier medium upward through the pipe 6 and delivers the same onto the foraminous or sieve-like sheet 11. The pipe 22 leading to the air jet or nozzle 21 communicates with a main pipe 23 leading to a source of air under pressure, not shown.

The tank 1 is provided with an overflow lip or channel 1' and the lighter fragmentary material floating near the surface of the medium in the cone, together with some of said medium, passes over this lip and is delivered thereby to an inclined sheet 24 of foraminous material, provided with any suitable well known means for imparting a shaking or vibratory movement thereto. The liquid medium passes through the foraminous sheet 24 into a receptacle 25, while the lighter fragmentary material passes downward on the foraminous sheet 24 and passes over a receptacle 26, and while over said receptacle it is sprayed with water, as by a spray 27, to wash therefrom any of the separating medium by which it is still wetted. The separating medium as it passes into the receptacle 25 is conveyed, by a pipe 28, to an air nozzle or jet 29 leading upward into a pipe 30, which pipe 30 is provided with a branch 31 through which the medium is delivered from the pipe 30 to the surface of the medium in the cone or tank. The air jet or nozzle 29 is connected by a pipe 32 to the pipe 23 leading to the source of air under pressure. By this means the lighter separating fluid medium that overflows from the surface of the cone is returned to the surface of the medium in the cone.

Means are provided whereby before the receptacle 25 can become entirely full, it may overflow into the receptacle 26. Any suitable passage or conduit for this purpose may be employed. As here shown, this is accomplished by having the point 26a where the walls of the two receptacles 25 and 26 join, slightly below the top of the receptacle 25, so that just before said receptacle is filled, the surface portion of the medium in said receptacle will flow over into the receptacle 26. Instead of (or if desired, in combination with) this overflow, means are provided for withdrawing the upper portion of the medium in the receptacle 25, as through a conduit 25' leaving said receptacle near the upper portion thereof and leading to any suitable tank or receptacle 25".

The importance of this lies in the fact that if there is an excess of fragmentary material or medium fed into the tank 1 so that the overflow therefrom through the lip 1' occurs faster than the same is returned by means of the jet 29, the excess is thus taken care of. Not only is the excess taken care of, but this overflow will contain slimes and other light impurities, as well as the lighter of the medium from the tank, which it is desirable to eliminate from the gravity medium, and these, when they enter the receptacle 25, flow near the surface of the medium therein and are thus removed either by overflow into the receptacle 26 or into the tank 25', or both, as may be found most desirable. The contents of the tank 25" and the receptacle 26 may be reconditioned for the purpose of conserving the solid material used to form the gravity separating medium.

One of the advantages of this construction lies in the fact that the heights of the medium in the receptacle 25 serves as an indicator to the operator which enables him to tell whether or not the specific gravity of the medium in the upper portion of the tank 1 is increasing or decreasing. In case the specific gravity is increasing, the heights of the medium in the receptacle 25 will be low; in case the specific gravity is decreasing, the heights of the medium in the receptacle 25 will be high, and when it starts to overflow, say at 26a or through the pipe 25' it is an indication to the operator that the specific gravity of the medium in the upper portion of the tank is too light. It will, of course, be appreciated that if the specific gravity of the medium in the upper portion of the tank is too light, some fragmentary material which it is desired to pass over the lip 1' will sink below the outlet of said lip, and yet will not sink to the lower portion of the tank. The results of this would be that there would be a collection of material which it is desired to discard, and this is avoided by increasing the specific gravity of the medium in the upper portion of the tank when the same appears to be falling below the specific gravity required.

The fragmentary material to be separated is supplied by means of a feed belt 33 leading from any suitable source, and this belt delivers the fragmentary material into a chute 34 whose lower delivery end is just above the surface of the separating medium in the cone and near the central portion thereof. Preferably the branch 31 opens into this chute near its bottom end as shown at 31'.

In order that the light fragmentary material that floats in the upper portion of the medium in the tank may be discharged with the overflow at the lip 1', such fragmentary material must, of course, be directed toward the periphery of the tank. Nevertheless, it is not desirable to have this light material thrown to the periphery before the heavier material has had time to sink. For the purpose of preventing the fragmentary material fed into the tank from being thrown too quickly to the periphery of the tank and discharged over the lip 1 before separation between the heavier and lighter material occurs, means are provided whereby the fragmentary material delivered into the tank is prevented from moving too quickly outward toward the periphery of the tank, and yet is gradually deflected outward toward the periphery. The result of this is that when the material reaches the overflow lip 1', the heavier material will have sunk below the level of the said lip 1', while the lighter or refuse material will pass over said lip. The means preferred and herein shown for this purpose consists of a section of a spiral blade 34', (Figs. 9 and 10), one end of which blade is near the central portion of the tank, and but slightly removed from the delivery end of the feed chute 34. This blade 34' is supported on the framework of the apparatus in any suitable manner and extends downward into the surface of the separating medium to a point slightly above the arms 10 supporting the blades 9. The end of the blade 34' that is nearest the mouth of the chute 34 is but a short distance radially outward from the flared mouth of the conduit 8; and the blade as it extends spirally around said conduit also extends further and further outward toward the periphery of the tank, until its other end is somewhat beyond the overflow lip 1'. The effect of this blade is to prevent the fragmentary material delivered into the tank from passing immediately outward to the periphery of the tank. On the contrary it is so controlled by the interior face of said blade that it gradually moves further and further outward from the center during which time the heavier material sinks within the gravity medium while the lighter material floats thereon or therein and moves gradually nearer and nearer to the periphery of the tank. As it moves onward around the tank, it passes outside of the blade and is crowded by the blade nearer and nearer to the periphery of the tank and the overflow lip 1'. The effect of this crowding is not only to cause the light material to pass over the lip but also to pass over the lip in a substantially uniform layer, thus preventing the tendency, which would otherwise occur, for the material to pass off to one side of the overflow lip rather than evenly thereover. This also avoids any undesirable rapid current over the overflow lip which would have a tendency to draw with it some of the heavier material which had otherwise sunk just below the level of the overflow lip.

The separating fluid medium is preferably prepared or conditioned in a suitable tank or at a suitable source, not shown, and delivered to the immediate supply tank 2, from which tank 2 a conduit 35 leads to a point well above the cone 1 and is provided with a branch 35' for delivering the separating medium into the flaring top 8' of the conduit 8. Another branch pipe 35" leads downward for the delivery of the separating liquid medium into the receptacle 25. It will be understood, of course, that suitable valves are employed to control the air pressure in the pipes 22 and 32 and to control the flow of separating liquid medium through the branch pipes 35' and 35".

As above stated, the specific gravity of the medium in the tank is one of a constantly increasing specific gravity from the surface of said medium downward to the bottom of the tank. While this increase in specific gravity is a constant increase, it need not be and generally is not a uniform increase. The desired specific gravity of the medium in treating some materials will increase gradually from the top downward, and at a continually increasing rate, so that near the bottom of the tank the increase in specific gravity is more rapid than in the upper portion of the tank.

At the initiation of the operation, gravity separating medium is provided in a suitable storage tank, the specific gravity of which is greater than that desired at the top of the tank when the apparatus is in full operation and the tank is filled up to the point of overflow with medium of this specific gravity. Then water is fed into the top of the cone with the result that the specific gravity of the medium at the upper portion of the cone is decreased; and there is supplied from a second tank gravity separating medium whose specific gravity is greater than that ultimately desired in the bottom of the tank, and a supply of this medium is fed into the lower portion of the tank simultaneously with the supply of water to the upper portion of the tank. The supply of water to the upper portion of the tank may be, and in practice frequently is, coincident with the supply of fragmentary material thereto. Preferably there is also supplied to the receptacle 25, separating medium of average specific gravity, this being supplied in sufficient quantity to fill the pipe 28 and the pipe 30 up to a suitable level in the receptacle 25.

Under these conditions the increase in volume of the tank contents, due to the supplies of water and fragmentary material at the upper portion of the tank and the supply of heavy separating medium at the bottom of the tank, produces an overflow at the lip 1', carrying with it all of the fragmentary material that is floated by the separating medium of a specific gravity existing at the time. As is evident, this overflow of medium at the lip 1' will be of less specific gravity than that of the medium originally introduced, and being delivered in the receptacle 25 serves in time to gradually reduce the specific gravity of the medium therein. It will be understood that the air jets 21 and 29 are opened and after operation for a short time under these conditions it will be found that the specific gravity of the medium in the tank will constantly increase from the surface of the medium in the tank to the bottom portion thereof, and when this condition is reached the apparatus is in proper condition to properly separate the fragmentary materials being treated.

While the above method described is one that may be conveniently employed in practical operation for establishing the proper condition of the medium in the tank, it will, of course, be understood that any suitable method of procedure which will accomplish these results falls within the limits of the invention.

Referring now to Figs. 3, 6 and 7, 8a is a conduit corresponding to conduit 8 of Figs. 1 and 2 in that it surrounds the pipe 6, but with an annular space between the two, and like conduit 8, it is attached to and revolves with the pipe 6, and like conduit 8, it is open at its bottom. This conduit 8a has a series of ports 37 formed in its walls, which series extends in a spiral direction from the top downwardly around said conduit 8a. Surrounding the conduit 8a and closely fitting the same, but capable of moving therearound, is a pipe 8b. This pipe also has a series of ports 38 formed in its walls, which series extends upward and in a spiral direction around the pipe, the spiral, however, being the reverse of the spiral series of ports 37 in the conduit 8a. The spacing of the ports in the two series is exactly equal so that the various pairs of ports lie in the same horizontal plane. Suitable means, such as a lever 39 (Fig. 7) secured to the pipe 8b enables said pipe to be turned around the conduit 8a, the lever being preferably held in any adjusted position in the arc 40, supported on the radial arms 10—10.

Figure 3:
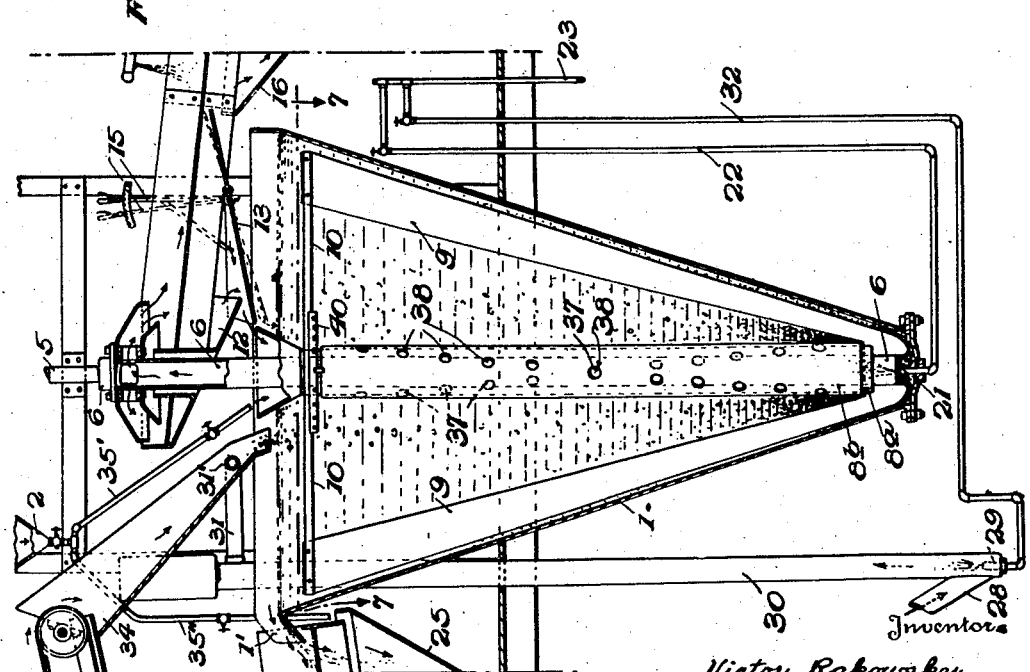
Fig. 3 is a vertical central section through the separating tank with means for returning that portion of the separating medium, which has been removed with the heavier separated material, to such point between the bottom and top of the medium in the tank as conditions may require.

Referring to Fig. 3, it will be seen that when the pipe 8b is adjusted around the conduit 8a, a port in the conduit 8a may be caused to register with a port in the pipe 8b, and some of the separating medium delivered into the top of the conduit 8a is permitted to flow out through the two registering ports 37—38 and into the cone. By adjusting the pipe 8b around the conduit 8a, it is thus possible to deliver separating liquid medium not only to the bottom of the cone but also to any one of a series of points thereabove up to near the top of the cone.

Referring now to Fig. 4, there is shown therein a modification of the construction just described as shown in Fig. 3, in that instead of two reversely spiraled series of ports in the pipes 8a and 8b there are provided two reversely spiraled slots 41—42, the spiraled slot 41 being formed in the conduit 8a, and the reversely spiraled slot 42 being formed in the pipe 8b and crossing the spiral slot 41. At the point where they cross, liquid in the pipe 8a may pass out into the cone. By adjusting the pipe 8b around the conduit 8a this point of exit for the liquid from the conduit 8a may be adjusted upward or downward as desired.

*Operation.*—Referring to Figs. 1 and 2, the tank or cone 1 having been filled with a liquid separating medium whose gravity gradually and constantly increases from the top to the bottom, the motor 4 is set in operation and the pipe 6 and the conduit 8 are revolved thereby. Since the paddle blades 9 are secured to the conduit 8, they are also slowly revolved. The fragmentary materials to be separated are fed in by means of the feed belt 33 and the chute 34 and are delivered into the liquid medium near the center of the tank. The lighter fragmentary materials float in the gravity separating medium, while the heavier fragmentary materials sink therein. The lighter materials are carried off by the overflow at 1' and delivered to the foraminous sheet 24, through which lighter separating medium passes into the receptacle 25, the lighter fragmentary materials, however, by reason of the vibration and agitation of the foraminous sheet 24, pass downward on said sheet and have any of the separating medium that still adheres thereto washed off by the water spray and delivered into the receptacle 26. The lighter separating medium which passes into the receptacle 25 is led down through the pipe 28 to the air jet 29 and is elevated thereby through the pipe 30 and branch pipe 31 and returned to the top of the separating medium in the cone. The slowly revolving blades 9 tend to gradually move the lighter materials outward toward the periphery of the cone, to the end that they will readily pass out through the overflow 1'. The heavier fragmentary material which has settled to the bottom of the cone, together with some of the heavier fluid medium is elevated by the air jet 21 through the pipe 6 and delivered on to the foraminous sheet 11, the fluid medium passing through said foraminous sheet while the heavier fragmentary material descends along said sheet to a point above the receptacle 16 where said fragmentary material is sprayed with water to wash off any separating medium that may adhere thereto, and said washed fragmentary material is then delivered at the extreme right of the receptacle 16, as shown in Figs. 1 and 2.

The heavier liquid medium which has passed through the foraminous sheet 11 is received by the inclined planes 12 and 13, that portion which falls upon the plane 12 being delivered to the plane 13 from which it is delivered either into the conduit 8 or to the upper surface of the separating medium in the tank, depending upon the adjustment of the trough 13. When said medium is delivered to the conduit 8 it passes down through said conduit and returns to the cone at the bottom part thereof. The gravity separating medium required to maintain the proper supply in the cone 1 is obtained by opening the valve in the pipe 35' and the medium delivered through this pipe passes through the conduit 8 to near the bottom of the cone. Any medium required to maintain the proper condition of the separating medium in the upper part of the cone is supplied by opening the valve in the pipe 35'' and is conveyed by way of the receptacle 25, pipes 28 and 30 through the operation of the air jet 29, and supplied to the tank through the branch pipe 31.

Under certain conditions when treating certain classes of fragmentary materials to be separated, or when it is found desirable for any reason to alter the specific gravity of the separating medium in the cone, the construction shown in Fig. 3 or 4 may be employed. By the use of such construction, separating medium delivered to the conduit 8a may be introduced into the body of the medium in the cone at any point desired from near the bottom to near the top thereof. There is thereby afforded means for efficiently regulating and controlling the specific gravity of the separating medium in the cone so as not only to maintain the constantly and gradually increasing specific gravity from the top to the bottom, but also regulate the rate of increase in the specific gravity therein.

It will be understood that the water passing into the receptacles 16 and 26 carries a small amount of separating medium. This is not passed to waste but is returned to a suitable conditioning tank or apparatus whereby the solids therein contained may be conserved and employed in reconditioning the medium for repeated use. From the reconditioning plant or tank the reconditioned medium may be returned to the supply tank 2 for reuse.

What is claimed is:

1. In an apparatus for separating fragmentary materials of differing specific gravities, the combination of a tank containing a gravity separating liquid medium of constantly increasing specific gravity from the top downward and consisting of a liquid and comminuted solids, means supplying the fragmentary materials thereto, a vertical conduit centrally located in said tank and open at its top and bottom, a second conduit surrounding said first named conduit but spaced therefrom, means elevating fragmentary material and separating medium through said first named conduit and delivering the same above the surface of the separating medium in the tank, means separating the elevated fragmentary material with a small amount of the solids of the medium clinging thereto from the medium, and means returning the separated medium otherwise unaltered to the tank through said second conduit.

2. In an apparatus for separating fragmentary materials of different specific gravities, the combination of a tank containing a gravity separating liquid medium of constantly increasing specific gravity from the top downward and composed of a liquid and comminuted solids and wherein the lighter material floats and the heavier material sinks, means within the tank continuously removing in a current of the medium said heavier material together with some of the medium from a lower level in said tank, means separating the removed material with a small amount of the solids of the medium clinging thereto from the thus removed medium, and means within the tank continuously vertically adjustable during operation for returning the thus separated medium otherwise unaltered to said tank.

3. In an apparatus for separating fragmentary materials of different specific gravities, the combination of a tank containing a gravity separating medium composed of a liquid and comminuted solids and of constantly increasing specific gravity from the top downward and wherein the lighter material floats and the heavier material sinks, a conduit within said tank and extending upward from a lower level therein, means continuously elevating heavier material in a current of the heavier medium through said conduit whereby heavier material and some heavy medium are removed from the tank, means separating the elevated material with a small amount of the solids of the medium clinging thereto from the thus removed medium, and means within the tank and having a delivery port vertically adjustable during operation through which the separated medium is returned to the tank.

4. In an apparatus for separating fragmentary materials of different specific gravities, the combination of a tank containing a gravity separating liquid medium consisting of a liquid and comminuted solids and wherein the lighter material floats and the heavier material sinks, a conduit within said tank and extending from near the bottom thereof to a point above the surface of said medium, a second conduit surrounding said first mentioned conduit but spaced therefrom, means elevating heavier material and some medium through said first mentioned conduit, means separating said elevated material with a small amount of the solids of the medium clinging thereto and the medium, and means returning the separated medium through said second conduit to the tank.

5. In an apparatus for separating fragmentary materials of different specific gravities, the combination of a tank containing a gravity separating liquid medium composed of a liquid and comminuted solids and wherein the lighter material floats and the heavier material sinks, a conduit within said tank and extending from near the bottom thereof to a point above the surface of said medium, a second conduit surrounding said first mentioned conduit but spaced therefrom and having an upwardly adjustable delivery port, means elevating heavier material and some medium through said first mentioned conduit, means separating said elevated material with a small amount of the solids of the medium clinging thereto from the medium and returning the separated medium unaltered through said second conduit to the tank.

6. In an apparatus for separating fragmentary materials of different specific gravities, the combination of a tank containing a gravity separating medium of constantly increasing specific gravity from the top downward and composed of a liquid and comminuted solids and wherein the lighter material floats and the heavier material sinks, a conduit within said tank and extending from a lower level in the tank to a point above the surface of said medium, a second conduit having telescopic sections within said tank, means continuously elevating heavier material in a current of the medium through said first named conduit, and means separating said elevated material with a small amount of the solids of the medium clinging thereto from the thus removed separated medium and returning the medium otherwise unaltered to the tank through said second conduit.

7. In an apparatus for separating fragmentary materials of different specific gravities, the combination of a tank containing a gravity separating liquid medium of constantly increasing specific gravity from the top downward and wherein the lighter material floats and the heavier material sinks, a conduit extending from a lower level in the tank to a point above the surface of said medium, a second conduit within said tank and having a delivery port adjustable during operation to different elevations in the tank, means continuously elevating heavier material in a current of the heavier medium through said first named conduit, and means separating said elevated material and medium and returning the separated medium to the tank through said second conduit.

8. In an apparatus for separating fragmentary materials of different specific gravities, the combination of a tank containing a gravity separating liquid medium wherein the lighter material floats and the heavier material sinks, a conduit within said tank and extending from a lower level in the tank to a point above the surface of said medium, a second conduit surrounding said first named conduit and having a spiral slot in its wall, a pipe surrounding said second conduit and having a spiral slot in reverse spiral to and crossing that in said second conduit, means effecting axial adjustment between said pipe and second conduit relative to each other, means elevating heavier material and some medium through said first named conduit, means separating said elevated material and medium, and means delivering said separated medium unaltered into said second conduit.

9. In an apparatus for separating fragmentary materials of different specific gravities, the combination of a tank containing a gravity separating liquid medium composed of a liquid and comminuted solids and wherein the lighter material floats and the heavier material sinks, a conduit leading downward into said tank from above the surface of said medium, means for introducing additional separating medium into said conduit, means continuously removing heavier material in a current of the medium from the lower portion of said tank, means separating the removed material with a small amount of the solids of the medium clinging thereto from the thus removed medium, and means continuously returning said separated medium to the tank otherwise unaltered through said conduit.

10. In an apparatus for separating fragmentary materials of different specific gravities, the combination of a tank containing a gravity separating liquid medium in which the lighter material floats and the heavier material sinks, a pipe centrally located in said tank and extending up above the surface of the medium in the tank, means elevating heavier material through said pipe, a plurality of stirring blades carried by said pipe, and means revolving said pipe.

11. In an apparatus for separating fragmentary material of different specific gravities, the combination of a tank containing a gravity separating liquid medium in which the lighter material floats and the heavier material sinks, a pipe centrally located in said tank and extending up above the surface of the medium in the tank, means elevating heavier material and some medium through said pipe, means separating said elevated materials and medium, a second pipe surrounding and carried by said first named pipe and discharging into said tank, means delivering said separated medium into said second pipe, a plurality of stirring blades carried by said second pipe, and means revolving both of said pipes.

12. In an apparatus for separating fragmentary materials of different specific gravities, the combination of a tank containing a gravity separating liquid of increasing specific gravity from the top downward and in which the lighter material floats and the heavier material sinks, means continuously removing lighter material and some lighter medium from the upper portion of the tank, means creating an upwardly directed current in said tank and continuously removing heavier material and some heavy medium from the lower part of said tank in said current, a plurality of conduits having delivery ports into said tank at different levels between the top and bottom of the medium in the tank, and means for supplying additional medium to the tank through said conduits.

13. In an apparatus for separating fragmentary materials of different specific gravities, the combination of a tank containing a gravity separating liquid of increasing specific gravity from the top downward and in which the lighter material floats and the heavier material sinks, means removing lighter material together with some lighter medium from the upper portion of the tank, means continuously removing heavier material in a current of heavy medium from the lower part of said tank, a plurality of concentric conduits centrally located within said tank and extending downward into the medium in said tank, said conduits being of different lengths and opening into the body of medium in the tank at different heights therein, and means for supplying additional medium to the tank through said conduits, whereby the additional medium may be introduced into the tank at different levels in the tank as desired.

14. The process of separating fragmentary materials of differing specific gravities which consists in feeding said material to a body of separating medium composed of a liquid and comminuted solids and of increasing specific gravity from the top downward and in which lighter material floats and heavier material sinks creating an upward current of heavy medium within the tank, continuously removing in said current heavier material together with some of the heavier medium from a lower level of said body of medium, separating the removed material with a small amount of the solids of the medium clinging thereto from the thus removed medium, and regulating the specific gravity of the main body of medium by returning some of said separated medium otherwise unaltered to the main body of medium at a point above the point of removal and below the surface of said main body.

15. In an apparatus for separating fragmentary materials of differing specific gravities, the combination of a tank containing a gravity separating liquid medium of constantly increasing specific gravity from the top to the bottom, means supplying the fragmentary materials thereto, an upwardly extending conduit in said tank open at its top and bottom, a second conduit surrounding said first named conduit but spaced therefrom and having a port intermediate the top and bottom of said first named conduit, means continuously elevating heavy fragmentary material and separating medium through said first named conduit and delivering the same above the surface of the separating medium in the tank, means separating the elevated material and elevated medium, and means continuously returning the latter to the tank through said second conduit.

16. In an apparatus for separating fragmentary materials of differing specific gravities, the combination of a tank containing a gravity separating liquid medium composed of a liquid and comminuted solids, means supplying the fragmentary materials thereto, an upwardly extending conduit in said tank open at its top and bottom, a second conduit surrounding said first named conduit but spaced therefrom, means elevating heavy fragmentary material and separating medium through said first named conduit and delivering the same above the surface of the separating medium in the tank, means separating the elevated material with a small amount of the solids of the medium clinging thereto and the elevated medium, and means returning the latter otherwise unaltered to the tank through said second conduit.

17. In a process of separating fragmentary materials of differing specific gravities in a gravity separating medium, the steps of providing a body of liquid separating medium composed of a liquid and comminuted solids and of constantly increasing specific gravity from the top downward, introducing the materials to be separated into the top of said body, constantly removing lighter material and some of the separating medium from the top of said body of medium, separating the lighter material and medium and constantly returning such separated medium to the surface of the main body of medium, simultaneously and constantly removing heavy material together with some medium from the bottom of said body, separating the heavier material with a small amount of the solids of the material clinging thereto from the thus removed medium, and returning said removed medium otherwise unaltered into the lower portion of said body.

18. In a process of separating fragmentary materials of differing specific gravities, the steps of introducing said materials into a body of liquid separating medium of constantly increasing specific gravity from the top downward, simultaneously creating two constant currents of medium from said body, one from the top carrying the lighter material and one from the bottom carrying heavier material, thereby continuously removing lighter material from the top and heavier material from the bottom of said body of medium, separating the removed materials with some of the medium clinging thereto from said currents of medium, and then continuously and separately returning said currents otherwise unaltered, one to the top and the other adjacent to the bottom of said body of medium.

19. In a process of separating fragmentary materials of differing specific gravities, the steps of forming a body of liquid separating medium of constantly increasing specific gravity from the top downward, introducing the materials to be separated into the top of said body, creating by compressed air a constant current of heavy medium from the bottom of said body, constantly removing heavier material from the bottom of said body in said current, separating the removed materials with some of the medium clinging thereto from said current and returning the separated medium otherwise unaltered to the bottom portions of said body of medium.

20. In an apparatus for separating fragmentary materials of differing specific gravities, the combination of a tank circular in cross section and containing a heavy liquid separating medium, means introducing materials to be separated into the top of said tank, a conduit concentric with said tank and extending from a point near the bottom to above the liquid therein, said conduit being open at its top and bottom, means producing an upward current of medium and heavier material through said conduit and discharging from the top thereof, means separating said material with some of the medium clinging thereto after they leave said conduit, and a second conduit concentric with said first named conduit and returning said separated medium to the tank around said first conduit.

21. In an apparatus for separating fragmentary materials of different specific gravities, the combination of a tank containing a gravity separating liquid medium of constantly increasing specific gravity from the top downward and composed of a liquid and comminuted solids wherein the lighter material floats and the heavier material sinks, means within the tank creating a current of medium from a lower level of the tank to a point without the tank and thereby continuously removing from the tank heavier material together with some of the medium from such lower level, means separating the removed material with a small amount of the solids of the medium clinging thereto from the removed medium, and means within the tank vertically adjustable during operation for returning the separated medium otherwise unaltered to said tank.

22. The process of separating fragmentary materials of different specific gravities which consists in introducing said materials into a separating medium of constantly increasing specific gravity from the top downward and composed of a liquid and comminuted solids and wherein the lighter material floats and the heavier material sinks, creating within the tank an upward current of the separating medium from a lower level in the tank, entraining heavier material in said current and delivering the current of medium and heavier material at a point above the surface of the medium in the tank, then separating the heavier material from the medium and returning the latter to the tank by gravity.

VICTOR RAKOWSKY.
RAY W. ARMS.
CHARLES B. HEBBARD.